United States Patent [19]
Bannister et al.

[11] Patent Number: 5,832,065
[45] Date of Patent: Nov. 3, 1998

[54] SYNCHRONOUS VOICE/DATA MESSAGE SYSTEM

[75] Inventors: Cecil Henry Bannister, Plano; Russell A. Edwards; Richard C. S. Mo, both of Dallas, all of Tex.

[73] Assignee: Northern Telecom Limited, Montreal, Canada

[21] Appl. No.: 725,551

[22] Filed: Oct. 3, 1996

Related U.S. Application Data

[63] Continuation of Ser. No. 635,210, Apr. 17, 1996, abandoned, which is a continuation of Ser. No. 255,770, Jun. 7, 1994, abandoned.

[51] Int. Cl.$^6$ .................................................. H04M 11/00
[52] U.S. Cl. ........................... 379/93.08; 379/93.14; 379/93.17; 379/93.19; 379/93.21; 379/93.24; 379/89
[58] Field of Search .......................... 379/93.17, 93.19, 379/93.21, 93.24; 348/14, 15, 17, 500, 512, 515; 370/260

[56] References Cited

U.S. PATENT DOCUMENTS

| | | | |
|---|---|---|---|
| 4,659,876 | 4/1987 | Sullivan et al. | 379/96 |
| 4,736,407 | 4/1988 | Dumas | 379/96 |
| 4,837,798 | 6/1989 | Cohen et al. | 379/88 |
| 5,189,691 | 2/1993 | Dunlap | 379/70 |
| 5,225,947 | 7/1993 | Wilson et al. | 360/72.1 |
| 5,239,373 | 8/1993 | Tang et al. | 348/15 |
| 5,253,275 | 10/1993 | Yurt et al. | 375/122 |
| 5,349,636 | 9/1994 | Irribarren | 379/89 |
| 5,351,276 | 9/1994 | Doll, Jr. et al. | 370/94.2 |
| 5,365,577 | 11/1994 | Davis et al. | 379/96 |
| 5,375,068 | 12/1994 | Palmer et al. | 370/62 |
| 5,383,182 | 1/1995 | Therasse et al. | 370/60 |
| 5,396,497 | 3/1995 | Veltman | 370/100.1 |
| 5,414,444 | 5/1995 | Britz | 348/151 |
| 5,617,539 | 4/1997 | Ludwig et al. | 370/260 |

FOREIGN PATENT DOCUMENTS

| | | |
|---|---|---|
| 489 365 | 6/1992 | European Pat. Off. . |
| 598 599 | 5/1994 | European Pat. Off. . |
| 2 167 917 | 6/1986 | United Kingdom . |

*Primary Examiner*—Stella Woo
*Attorney, Agent, or Firm*—Foley & Lardner

[57] ABSTRACT

A synchronous voice/data messaging system allows parties to communicate both voice and graphic information or other data interactively or to retrieve such information synchronously in the exact sequence in which it was created. Voice information and data information are transmitted on a voice channel and a data channel. Time stamps are generated to synchronize the voice and data information. The time stamps can be generated either in a user device or in a multimedia messaging system. In either case, the voice and graphic or other data is played back to the called party in the exact sequence and at a rate corresponding to the rate at which it was received. Such a system can also be used to provide other services such as synchronous voice/data messaging while on hold or as part of a multimedia greeting.

6 Claims, 3 Drawing Sheets

5,832,065

SYNCHRONOUS VOICE/DATA MESSAGE SYSTEM

This application is a continuation of application Ser. No. 08/635,210, filed Apr. 17, 1996, now abandoned which is a continuation of application Ser. No. 08/255,770, filed Jun. 7, 1994 now abandoned.

BACKGROUND OF THE INVENTION

1. Field of the Invention

The invention concerns telecommunications devices useful for synchronous voice data messaging. In particular, the invention concerns devices for transmitting and receiving both voice and display information and includes portable devices such as personal digital assistants.

2. Related Art

Usually, the simplest way for persons to convey information to each other is with the aid of a pencil and paper. Typically, a concept or idea is described verbally while elements being described are sketched, drawn or written on paper. Modern work stations, including pen-based work stations, allow similar interaction to take place between persons in remote locations. Parties to a discussion can share a graphical/visual space where they can make and modify sketches and drawings at the same time.

A difficulty is encountered in systems where such information is to be transferred in a non-real-time fashion. For example, in a system in which voice and data, such as graphic information, are stored for later playback, the graphic information is generally stored in its final form. When retrieved and reproduced, the viewer sees only the final graphic product and loses the sequence in which the graphic information, such as a drawing, was constructed. As a result, one who simultaneously listens to the voice message and views the graphic message at a later time loses the information inherent in viewing the sequence in which the graphic message was created. Thus, there is a need for a voice/data messaging system which preserves the synchronicity of voice and data information. To date, no such systems are available.

SUMMARY AND OBJECTS OF THE INVENTION

In view of the above limitations of the related art it is an object of the invention to provide an apparatus which allows parties to share voice and graphical space interactively.

It is a further object of the invention to provide a party with graphical or other data information synchronously with voice information.

It is still another object of the invention to allow such sharing of voice and graphical space interactively and to provide such graphical and voice information synchronously over a telecommunications link.

It is still another object of the invention to provide these features with portable devices.

It is still a further object of the invention to allow playback of voice and data messages in a synchronous manner at any time after the message is generated, for example messages including graphic, voice information or other drawing information.

A system for synchronous data and voice storage and retrieval according to the invention includes a voice communication device to provide voice information from a transmitting user to a voice storage device, such as a voice recording device, under the control of a service controller. Such a system also includes a data communications device which provides data from the transmitting user to a data storage device, such as a data recording device, also under the control of a service controller. In a system according to the invention, the service controller includes a time stamping means, such as a clock, counter or other time indicator, which synchronizes data information with the voice information as the voice information and the data information are generated and/or stored. This is accomplished by generating data and voice synchronizing time stamps.

According to the invention, a playback device plays back the data information and the voice information in a sequence and at a rate which matches the sequence in which the data and voice information were generated and/or stored as determined from the time stamps. Thus, the system allows data information representing written information generated in real time synchronously with voice information to be reproduced in the same sequence and at the same rate in which it was generated.

A system according to the invention also has controls to provide a pause in voice recording while data recording is continued. This feature might be employed when a user is sketching a diagram to be transmitted as data, while not speaking for some time period. Such a pause could be implemented automatically when voice data is not detected for a predetermined time period or manually by activation of the feature by the transmitting user.

A system according to the invention would also allow a user to perform certain functions. Control signals to implement various commands and other instructions at appropriate times could be stored. For example, by activating a key or some other means to execute a predetermined stored command, a user could clear a screen display.

The playback device may have auxiliary controls to customize playback functions including, for example, freeze frame, rewind, fast-forward, pause and other typically desirable playback functions.

BRIEF DESCRIPTION OF THE DRAWINGS

The invention will be described in particularity with reference to the drawings in which.

DETAILED DESCRIPTION OF THE INVENTION

Figure 1:
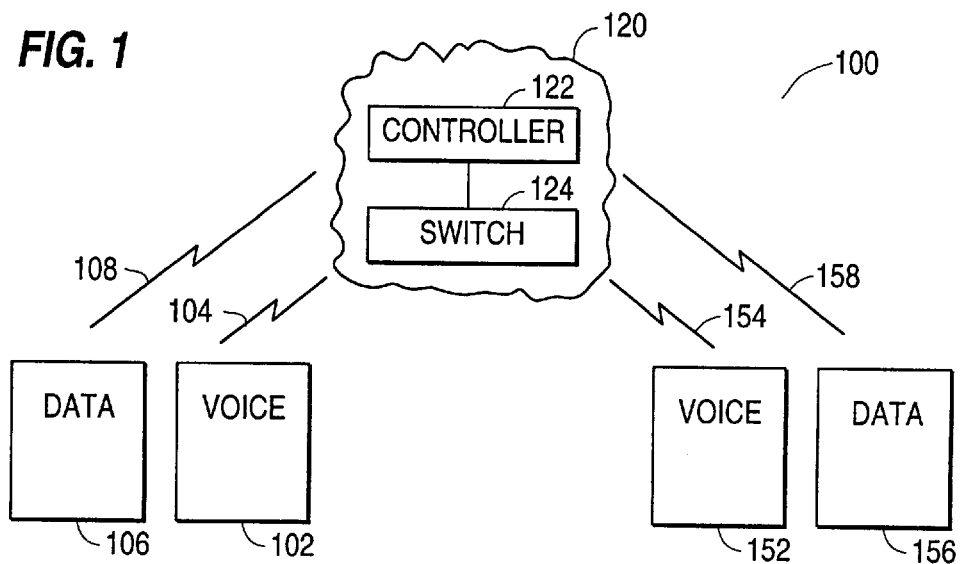
FIG. 1 illustrates a system in which the invention can be employed.

FIG. 1 illustrates a system 100 in which a system according to the invention can be implemented. First voice device 102 communicates with network 120 over a voice channel 104. Network 120 includes a controller 122 and switch 124 to route the voice information on voice link 154 to voice device 152. The links 104, 108, 154, 158 in the system are shown to be bidirectional and the system is intended to encompass communications originating in any of devices 102, 106, 152, and 156. In the case where the sender, for example the user of voice device 102, wishes to develop a sketch or drawing while discussing a matter with the party receiving the call, the sender may use a device 106, such as a personal digital assistant (PDA), computer, or other device which provides data, such as graphic or text data. According to the invention, as the voice information is transmitted from voice device 102 on voice link 104 to the network 120, the simultaneously generated graphical information is transmitted from device 106 on data link 108 to network 120. Network 120 processes the voice and data information received and transmits the voice information to voice device 152 over voice link 154 and the graphical or other data information to data device 156 over data link 158. This voice and data information is also transmitted simultaneously in a synchronous manner. As the sender provides voice information and simultaneously created graphical information, the voice and graphical information is received in the same sequence at the recipient's voice and data apparatus 152 and 156, respectively. The recipient can also be using a PDA, computer or other device which utilizes data, such as graphic or text data. As previously noted, the system works in the same manner in the other direction for communications originating at voice and data devices 152, 156 and destined for voice and data devices 102, 106. It is also possible to integrate the functions of the voice and data devices into a single device.

In another mode of operation according to the invention, in systems which provide a time delay between transmission and playback or in systems where playback is at a later time, it is not necessary for the voice and data to be transmitted synchronously by the user. It is only necessary that coding be provided, such that the correct relative timing and order sequence of the voice and data can be reconstructed to provide synchronous playback of voice and data information. Where the voice information is to be routed to voice mail and data routed to data storage, for example, where the originator receives no answer to a call and voice mail is activated, data link resources can be conserved by using the same link, e.g., 108, to transmit both the voice information to voice mail and the data information to data storage. This is possible since the coding provides the correct timing and order sequence of the information for playback. According to the invention, information can also be transmitted to a PDA for synchronous voice and data playback using a single transmission link. The coded information can be decoded in the PDA after both the voice and data have been received and synchronous playback can be performed.

A processor is used to generate time stamps that synchronize the voice and data information transmitted on voice link 104 and data link 108. Such time stamps can represent absolute time or time measured from a fixed event, such as a call connection, and can be generated in any known manner, for example by a clock, counter or other means for measuring absolute or elapsed time. These time stamps are available to be transmitted through voice link 154 and/or data link 158 to voice apparatus 152 and data/or apparatus 156, which, for example, could be a display apparatus with a display screen and/or memory. The processor for generating such time stamps can reside in network 120, for example, in controller 122, or in the data generation device, e.g., device 106. In one embodiment voice data from device 102 is generated, recorded and played back in a conventional manner, while data from device 106 is played back in the order and time dictated by the time stamps to achieve synchronicity between the data and voice information. Where voice information is sampled at a fixed rate, time information is inherent and time stamps for the voice information are not absolutely required.

However, time stamps for voice information are required where voice compression techniques, such as deleting silence, are used. This is necessary to assure that when the compressed voice information is played back it is played back in accordance with the time stamps to synchronize the voice and data information. Thus, in another embodiment, both the data and voice information are time stamped either upon receipt by network 120 or upon generation of the voice and data by time stamping circuitry in the originating data device, e.g., 106 and transmitting voice device, e.g., 102. Another application for time stamping voice information was previously discussed where one form of information, such as voice information is sent first and the other form of information, such as data, is sent at a later time, for example, using the same link. In this case, coding both the voice and data information with time stamps conserves system link resources, since the time stamps can be used to synchronize the voice and data information on playback. In addition, where link resources are scarce, as when the system in which the communication takes place is very busy, time stamping the data allows the data to be transmitted on a link that becomes available during a later period of reduced load, since the voice and data information can be synchronized for playback using the time stamps.

Synchronous playback would then be achieved by playback of both voice and data information at the corresponding time stamps. Synchronous playback can be achieved by synchronously transmitting the voice and data information from network 120 to data device 156 and voice device 152 in accordance with the time stamps. Devices 152 and 156 can then store or playback the voice and data information in the time ordered sequence and at the same rate in which it was received. In this case, it is not absolutely necessary for devices 152 and 156 to receive the time stamps. Alternatively, the raw voice and data information can be transmitted from network 120 with the time stamp information in any order and devices 152 and 156 can reconstruct the time ordered sequence for playback according to the time stamps received. These alternatives are by way of illustration and not limitation, as a system according to the invention can employ any arrangement wherein the voice and data information can be played back synchronously in the time ordered sequence and at the rate in which such data was generated. A system according to the invention can also implement a fast or slow playback mode in which the voice and data are played back synchronously in the same time ordered sequence at which the information was received, but at a rate faster or slower than the rate at which the information was received.

When the designated recipient of the caller's voice and data information is unavailable, either because the recipient does not answer or the recipient's voice and data device are otherwise busy, network 120 can implement the recipient's busy/don't answer response. For example, network 120 could send the time stamped voice and data information to a voice mail or other recording apparatus. By accessing the stored voice and data information with the time stamps, the intended recipient can play back the exact sequence in which the voice and data information were transmitted. Following the exact sequence and rate using the time stamps, the display apparatus illustrates the generation of the graphic information synchronously with the corresponding voice information. Thus, the recipient receives the benefit of the inherent information conveyed by seeing the sequence of the creation of the graphic image with the corresponding voice data. This is in contrast to a typical system in which the graphical information will initially be displayed in its complete form and the voice information will be played back independently as an associated voice annotation.

Even in cases where the recipient receives the voice and data information instantly, the time stamps can still be used by the recipient to record the voice and data information for later playback in a synchronous manner, as discussed above.

Figure 2:
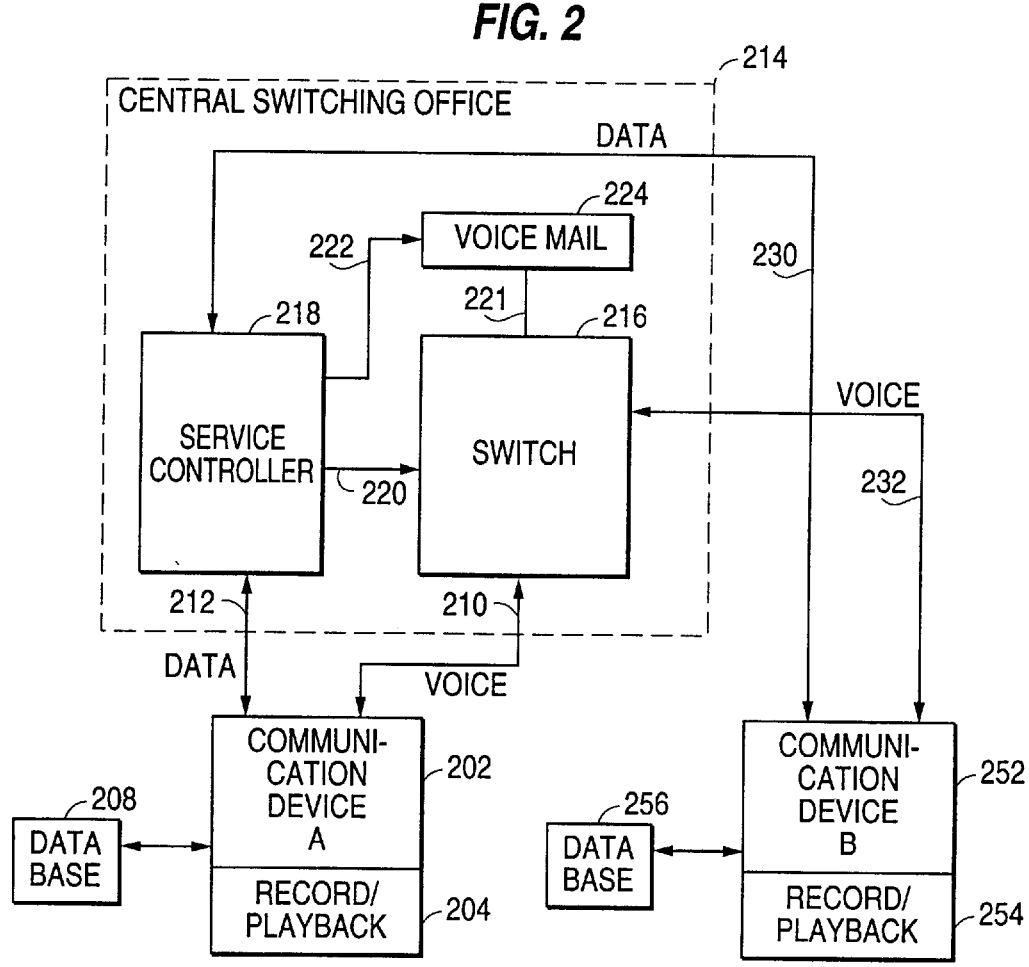
FIG. 2 is an overall block diagram of a system according to the invention.

FIG. 2 further illustrates an embodiment of a system according to the invention, which can be implemented in a conventional wire line telephone system, a cellular telephone system, or any other kind of telecommunication system. Telecommunications device A 202 has a record and playback feature 204 and communicates with a computer or database 208. The computer/database 208 and record/playback features can be directly integrated with communication device A 202 or may be embodied in a separate apparatus communicating with communications device A 202.

Communications device A 202 provides voice and data information over links, 210, 212 to a switching office, for example, central office (co) 214. Switching office 214 includes routing switch 216 responsive to service controller 218 for routing voice information. Data information is routed to the service controller 218. As previously noted, data information may be received with time stamps generated at the originating device or data may be time stamped upon receipt at the service controller 218. Service controller 218 provides switch commands on signal lines 220 to switch 216. In addition, service controller 218 also routes voice mail control information to voice mail unit 224 on lines 222, which receives voice information from the switch via line 221. Optionally the voice information or the voice mail control information may have time stamps, as discussed above.

Time stamps may be generated in response to voice and data information or may be generated continuously, for example, as indications of a real time clock. As previously noted, it may not be necessary to time stamp both voice and data information, as long as at least one of these types of data is coded sufficiently to provide synchronous playback according to the time ordered sequence of voice and data generation.

The time stamps can be handled solely in the service controller, if the voice and data information is routed within the central office, for example to a voice mail system 224. In this instance, only circuitry in the switching office 214 need keep track of the time stamps and the communication devices 202 and 252 need not be aware of their existence. In this case, when communication device B 252 later accesses voice and data information from communication device A 202 through recording subsystem 224, such as voice mail, outgoing voice information is provided from switch 216 on signal lines 232 to communication device B. Synchronously, service controller 218 provides data information on signal line 230 to communication device B. The user at communication device B will then receive synchronized voice and data information to produce a graphic image in the order and timing in which it was created synchronously with the voice description.

Alternatively, communication device B could be equipped with record and playback features 254 and a database 256, as previously discussed with respect to communication device A. By receiving the information in the time sequence in which it was generated, record/playback device 254 can be used to record the information in the same sequence. Thus, user of communication device B 252 has a complete record of the sequence and corresponding voice information which the user of communication device A employed to provide the information.

Another alternative is for the switch 216 and service controller 218 to transmit voice and time stamped data information, respectively, to communication device B. This would allow the communication device B to receive and record the time stamps themselves. With the time stamped information, communication device B could synchronously reproduce the voice and data information in the sequence and timing in which it was generated. Unless voice compression is employed, it is not necessary to time stamp voice information, since time stamps are inherent in voice information sampled at a fixed rate.

Another feature according to the invention is the ability to provide a template or other graphic information on which new graphic information is superimposed. For example, the user of communication device A 202 could access data base 208 for a template and superimpose additional graphic information on the template. The data base could be integrated into or separate from the communication device A. The template would be transmitted as data. The graphic information superimposed thereon would also be transferred as data synchronously with the voice information generated at the same time the new graphic information is superimposed or created.

Figure 3:
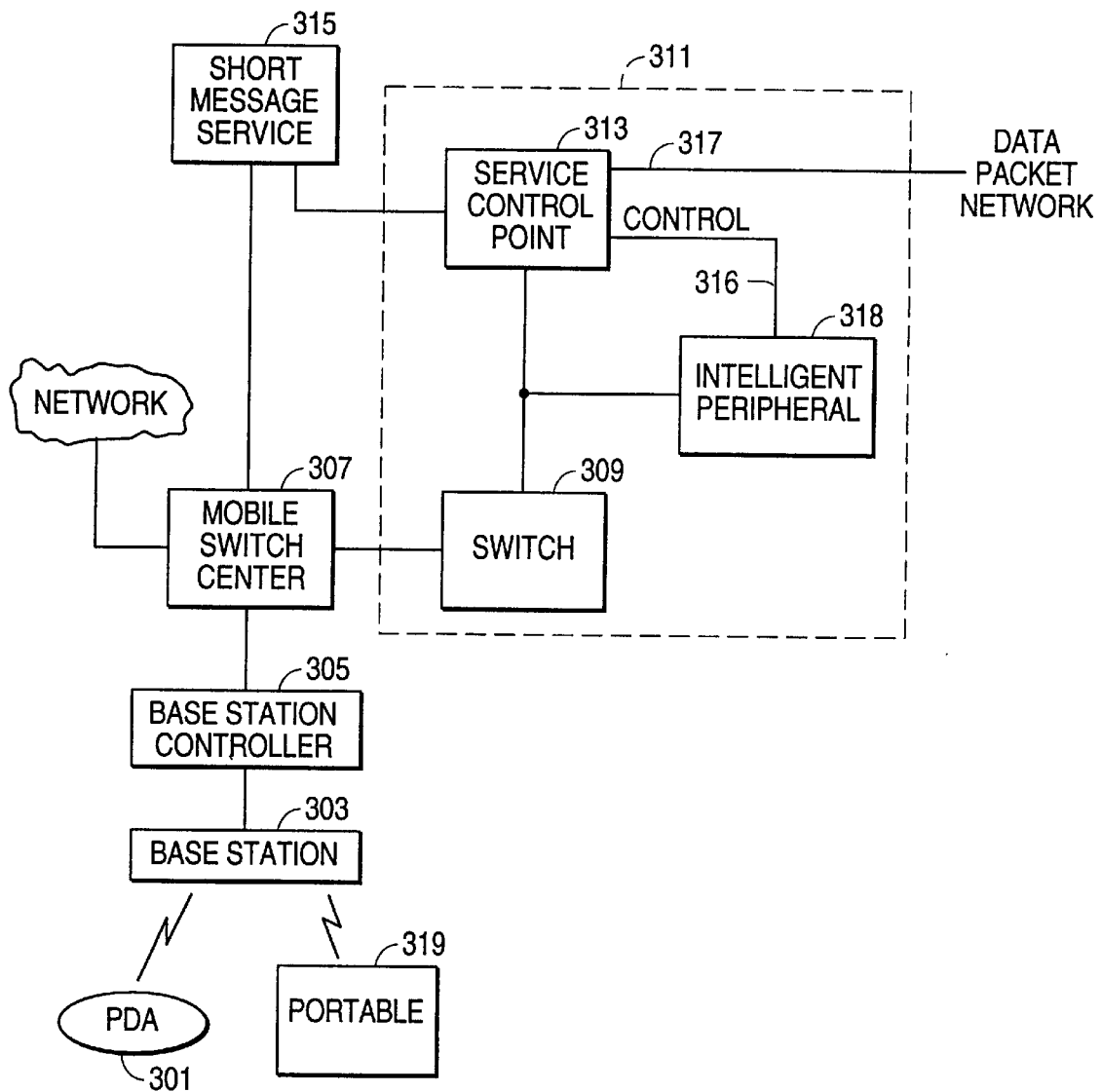
FIG. 3 illustrates one embodiment according to the invention.

FIG. 3 illustrates a wireless application of a system according to the invention. In a typical scenario, a wireless subscriber originates a call under the control of personal digital assistant (PDA) 301 through base station 303 which is controlled by base station controller 305. The base station controller 305 provides information to a mobile switching center 307 which is connected to the telephone network and to a central office switch 309. At the central office (CO) 311, the central office switch 309 is also connected to a service control point 313, which can provide short message service 315 (SMS) and connect to a data packet network along signal lines 317. An intelligent peripheral 318 can also be employed in the central office receiving and transmitting control information on signal line 316.

In such an application, the PDA informs the service control point of a number to be called. The service control point originates the call on behalf of the user as soon as the user goes off hook on the associated phone, such as portable 319. When the called party is busy or does not answer, the user or personal digital assistant 301 and portable 319 can leave a voice message or elect to leave a synchronous voice/data message as previously described. Data from the PDA could be sent using the second B channel associated with the voice B channel in an integrated services digital network (ISDN) environment.

A synchronous voice/data messaging application provided on the personal digital assistant 301 collects data samples from the pen input and transmits this information along the data channel. The service control point, for example, a multimedia mail system, time stamps these samples and stores them synchronously with the voice information. When retrieved, the service control point sends raw samples to the synchronous voice/data messaging application in the PDA of the called party following the order and time of the time stamps, together with the voice information to the associated phone. In this way, desired synchronicity is achieved without the need for sending time stamps to the called party. Because the service control point 313 is the only entity dealing with time stamps, the PDA messaging application can also be used for interactive sharing of the visual space between the PDA of the caller and the called party in real time.

Figure 4:
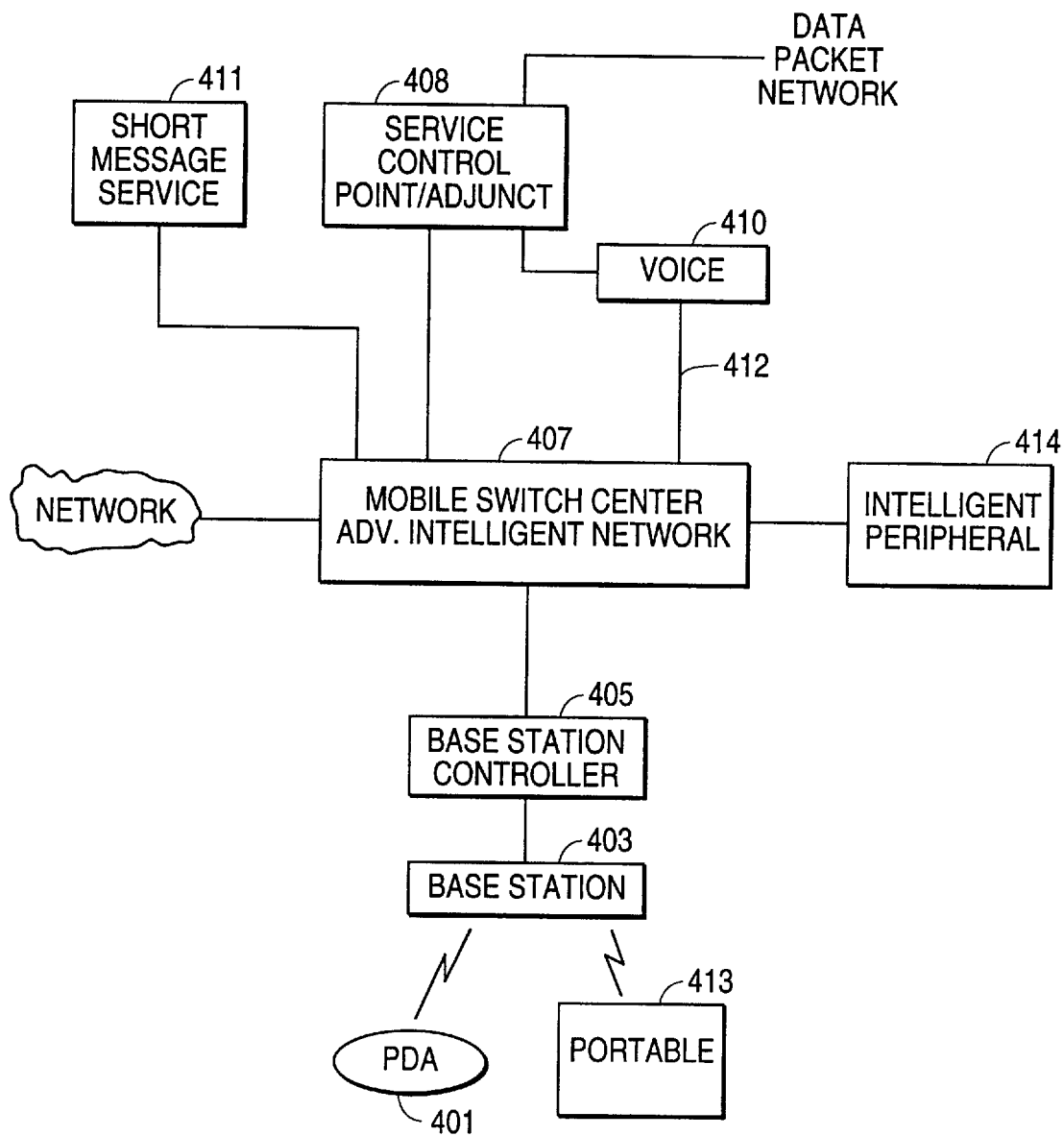
FIG. 4 illustrates an alternative embodiment of a system according to the invention.

FIG. 4 illustrates a further embodiment of a system according to the invention. In this case, personal digital assistant 401 provides information to base station 403 and, from base station controller 405, to mobile switching center 407. In this case, the mobile switching center 407 incorporates an advanced intelligent network to perform the switching functions. The advanced intelligent network communicates with a service control point/adjunct 408 which provides information to the data packet network on signal lines 409 and to short message service 411 and to voice service 410, which receives control information from mobile switch center 407 on signal line 412. Intelligent peripheral 414 also communicates with mobile switch center 407. Portable 413 corresponds to portable 319 in FIG. 3. Operation of a system configured in this way is essentially the same as that previously described herein.

A synchronous voice/data messaging system according to the invention also provides the opportunity to enhance services. For example, voice messaging is a commonly used mechanism to leave messages with another party without the intervention of a third party, such as a secretary. For subscribers that have a PDA associated with their phone, a synchronous voice data message can be left, as described herein.

In addition, when a calling party is routed to another party's multimedia mail system, the receiving party can provide a synchronous/data message greeting. The called party's synchronous/data message greeting can be personalized or otherwise customized. For example, the called party can transmit a synchronous voice/data message with soft keys for the caller to indicate the urgency of the call or whether the caller is to be reached on a particular device such as a wireless system, or other information.

A synchronous voice/data greeting can also be used to provide advertising. For example, when a call to a business is routed to a multimedia mail system or alternative call distribution (ACD) queue, a brief description of the business, its services and other relevant information can be provided as a synchronous voice/data message before requesting the caller to respond or leave a message.

A further service which can be offered includes advertising while a caller is on hold. During these short periods of time, a multimedia system can be used to provide an effective synchronous voice/data advertising message to the caller on hold.

A system according to the invention also has application in education and business where real time presentations with voice and graphic information are transmitted to other locations and played either contemporaneously or at a later time. For example, synchronous playback of voice information and graphical information in the sequence in which the voice and data information was generated using a system according to the invention described herein reduces the need for sophisticated video equipment and wide bandwidth transmission channels.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A personal communications and multimedia mail system for providing synchronous communication of data and voice, comprising:

first, second, third and fourth telecommunications links,
a first portable communications device comprising a voice input unit, a data input unit, and a transceiver unit, wherein the data input unit accepts data as input by a user command from a data base, the voice input unit accepts voice signals of a user, and the transceiver unit transmits said voice signals over the first telecommunications link and the data over said the second telecommunications link,
a central switching office for receiving and storing said voice signals transmitted over the first telecommunications link from said first portable communications device and the data transmitted over the second telecommunications link from said first portable communications device, and retransmitting said data over said third telecommunications link and retransmitting said voice signals over said fourth telecommunications link, said central switching office including:
  a service controller for receiving the data directly from the first portable communications device over the second telecommunications link,
  a switch for receiving the voice signals directly from the first portable communications device over the first telecommunications link, and
  a voice mail unit connected to the service controller and the switch and configured to temporarily store the voice signals in a case where a destination device is not currently available to receive the data and the voice signals,
a second portable communication device, which corresponds to the destination device, said second portable communication device comprising a voice output unit, a data display unit, and a transceiver unit, wherein said second portable communication device receives said voice signals over the fourth communications link and said data over third telecommunications link, the data display unit outputs the data received over said third telecommunications link as a dynamic visible display and the voice output unit outputs the voice received over said fourth telecommunications link as audible voice instructions corresponding to the dynamic visible display, and
a time stamp means for placing time stamps on the voice signals and the data,
wherein the switch outputs the voice signals received over the first telecommunications link to the fourth telecommunications link based on control signals received from the service controller, the service controller providing the control signals to the switch based on decoding of the data received over the second telecommunications link.

2. A personal communications and multimedia mail system according to claim 1, wherein said time stamp means is disposed in one of the first portable telecommunications device and the service controller.

3. A personal communications and multimedia mail system according to claim 2, wherein, when said time stamp means is disposed in said service controller, said time stamp means places said time stamps on said data received over said second telecommunications link based on a time when said data are received by said service controller over said second telecommunications link, and said time stamps are placed on said voice signals received over said first telecommunications link by said switch based on said control signals sent from said service controller to said switch.

4. A personal communication and multimedia mail system according to claim 1, wherein said second portable telecommunications device records the time stamps based on the data received over the third telecommunications link and the voice signals received simultaneously over the fourth telecommunications link, and wherein the second portable telecommunications device is capable of synchronously reproducing the voice signals and the data at a later time based on the time stamps.

5. A personal communication and multimedia mail system according to claim 1, wherein in a case where said voice mail unit has temporarily stored the voice signals due to said destination device not being available to receive the data and the voice signals at a time when the data and the voice signals were initially received by the central switching office, at a later time when the destination device is able to receive the data and the voice signals based on a signal sent from the destination device to the central switching office, the temporarily stored voice signals are output to said switch and routed to said destination device over the fourth telecommunications link, and at a same time the data are routed to said destination device directly from said service controller over the third telecommunications link.

6. A personal communication and multimedia mail system according to claim 1, wherein the data that is received by the service controller over the second telecommunications link are capable of being received at a different time with respect to when corresponding voice signals are received by the switch over the first telecommunications link, and wherein the time stamp means provides information so as to equate portions of the data to be output with portions of the voice signals at a synchronized timing by the second portable communications device.

\* \* \* \* \*